United States Patent [19]
Caffee

[11] Patent Number: 5,516,122
[45] Date of Patent: May 14, 1996

[54] ULTRA HIGH VACUUM ELASTOMER SEAL

[76] Inventor: Barry K. Caffee, 5176 Wildwood Dr., Mt. Pleasant, Mich. 48858

[21] Appl. No.: 164,337

[22] Filed: Dec. 10, 1993

[51] Int. Cl.$^6$ .................................................. F16J 15/06
[52] U.S. Cl. ...................... 277/167.5; 277/169; 285/336; 285/918
[58] Field of Search ................. 277/167.5, 168, 277/169, 236; 285/336, 350, 917, 918

[56] References Cited

U.S. PATENT DOCUMENTS

| | | | |
|---|---|---|---|
| 392,931 | 11/1888 | Prindle | 277/169 |
| 411,006 | 9/1889 | Blatt | 277/167.5 |
| 1,238,802 | 9/1917 | Nagel | 285/336 X |
| 2,662,785 | 12/1953 | Fawick | 285/336 X |
| 2,690,360 | 9/1954 | Young | 277/167.5 X |
| 2,829,793 | 4/1958 | Baumann | 285/336 X |
| 3,731,954 | 5/1973 | Haglund | 285/336 X |
| 3,888,496 | 6/1975 | Dryer | 285/336 X |
| 4,130,301 | 12/1978 | Dunham et al. | 285/336 X |
| 4,252,332 | 2/1981 | Nakayama et al. | 277/168 |

FOREIGN PATENT DOCUMENTS

| | | | |
|---|---|---|---|
| 1438458 | 4/1966 | France | 285/336 |
| 91308 | 5/1968 | France | 285/336 |
| 1912106 | 10/1969 | Germany | 277/167.5 |
| 2437567 | 2/1976 | Germany | 277/168 |
| 574134 | 12/1945 | United Kingdom | 277/167.5 |
| 1044599 | 10/1966 | United Kingdom | 285/336 |

OTHER PUBLICATIONS

A. Roth: "Vacuum Sealing Techniques"; Jan. 15, 1970; pp. 307, 318–320, 326–330, 345–349, 398–399.
H. Hugo Butcher: "Industrial Sealing Technology"; Jul. 23, 1986; pp. 70–82.
"Seals and Sealing Handbook"; Gulf Publ. Co.; Jul. 1, 1986; p. 26.

Primary Examiner—Scott W. Cummings
Attorney, Agent, or Firm—Edward Berkowitz; Bella Fishman

[57] ABSTRACT

An ultra high vacuum (UHV) joint is sealed by an elastomer O-ring (7) between adjacent flanges (3,4), fitting in a seal cavity formed by grooves (41,42) in the flange (3,4) surfaces. The groove surfaces (41,42) are highly polished and shaped such that the O-ring (7) conforms to the groove surfaces (41,42) and contacts them substantially entirely when the flanges (3,4) are clamped together. This improved structure significantly reduces the permeation through and the gas leakage around the seal (7). The resulting seal (7) can support a vacuum of $10^{-11}$ torr or better. The conformal-groove geometry of the present invention can be used with seals other than elastomer seals, such as soft metal seals (55,65).

8 Claims, 3 Drawing Sheets

ULTRA HIGH VACUUM ELASTOMER SEAL

FIELD OF THE INVENTION

This invention is related generally to the field of sealing technology, and more particularly, to the field of ultra high vacuum (UHV) seals preferably utilizing elastomer seal materials.

DESCRIPTION OF BACKGROUND ART

Ultra high vacuum (UHV) systems require seals between joints that will prevent leakage down to a vacuum chamber pressure of substantially less than $10^{-8}$ torr. For low to medium vacuum (greater than $10^{-8}$ torr pressure), seals may be satisfactorily fabricated of elastomer materials. However these elastomer seals have been unsatisfactory in the past for higher vacuum systems.

UHV systems must generally be baked after each venting to air, typically at a temperature of 200° C. for a period lasting 24 hours or more, to drive out gases from the walls of the vacuum chamber. Most elastomer seal materials undergo thermal setting under these bakeout conditions, and they have a permeation rate that equals or even exceeds the outgassing rate from the walls of the vacuum chamber. To pump these systems down to high vacuum requires an excessive number of vacuum pumps. Attempts have been made to reduce the permeation through the elastomer by manufacturing the elastomer in a different manner. Attempts have also been made to improve the seal by means of using grease. This technique has the unsatisfactory consequence that the vacuum system becomes contaminated by the grease material during bakeout. The prior art (FIG. 2) groove 43 design has proven to be unsatisfactory for using elastomer seals 17 from air 71 to UHV 20.

For this reason, UHV systems in the past have generally utilized metal seal technology, in which the seal material is a metal gasket such as copper. This technology provides ultra high vacuum-seals down to $10^{-12}$ torr pressure. However, metal seals are more expensive and inconvenient from the standpoint of the user. The seal must be replaced after each venting. The design of the metal-sealed joint is also more complex.

The effectiveness of an elastomer seal is primarily a function of two phenomena. First there is the phenomenon of permeation through the bulk elastomer material caused by microchannels or holes inherent in the material due to its chemistry and manufacturing processes. Second is the phenomenon of gas leakage around the seal at the elastomer/metal interface. The roughness of the metal surface in contact with the elastomer seal affects the amount of gas leakage. Typically, a surface finish of 32 microinches is regarded as adequate. The surface comprises a multitude of grooves with peaks and valleys, and the elastomer seals against the peaks but does not fill the valleys, even under high sealing pressure. These valleys provide channels through which gas may leak past the seal. Improving the surface finish by electropolishing alleviates, but does not eliminate, this leakage mechanism.

In addition, the metal surface is often produced by lathe machining, which generates a spiral groove pattern. This groove is a long continuous open path under the seal that allows a further gas leakage flow when used with elastomer seals.

The elastomer surface is itself rough, allowing for the leakage of gases along the surface of the elastomer.

DISCLOSURE OF INVENTION

The present invention is a seal (7) for a UHV system in which the seal material is preferably an elastomer. In a flange joint between two abutting pipes (1,2) of a vacuum system, the seal is provided by an elastomer O-ring (7) between opposing metal flanges (3,4). The O-ring (7) fits in mating grooves (41,42) in each of the flange surfaces (5,6). These grooves (41,42) are substantially semicircular in cross section so that they conform to the surface of the O-ring (7). The groove (41,42) surfaces are highly polished, and when the joint is tightened, substantially the entire surface of each groove (41,42) is in contact with the surface of the O-ring (7), and almost the entire surface of the O-ring (7) is in contact with the metal grooves (41,42). Having the vast majority of the surface area of the elastomer (7) in contact with the grooves (41,43) advantageously substantially increases the leak path around the elastomer (7) as compared with the prior art. Further, the permeation rate is a function of the exposed surface (8,9) area for gases to enter and leave the elastomer (7). The present invention advantageously substantially reduces this exposed surface (8,9) area compared with the prior art.

Alternative embodiments of the invention include groove surfaces (35, 35', 36, 36') that have other than semicircular cross sections, and elastomer O-rings (37) that have non-circular cross sections. In each of these embodiments, the surface of the elastomer seal (37) conforms to the contour of the groove surfaces (35, 35', 36, 36') substantially over the entire groove, and the mating grooves (35, 35', 36, 36') enclose the elastomer seal (37) and compress it as the joint is tightened. This structure significantly reduces gas leakage mechanisms around the elastomer seal (37), resulting in a substantially improved vacuum seal (37).

DETAILED DESCRIPTION OF THE PREFERRED EMBODIMENTS

It is understood that figures discussed herein may not be drawn to scale.

Figure 1:
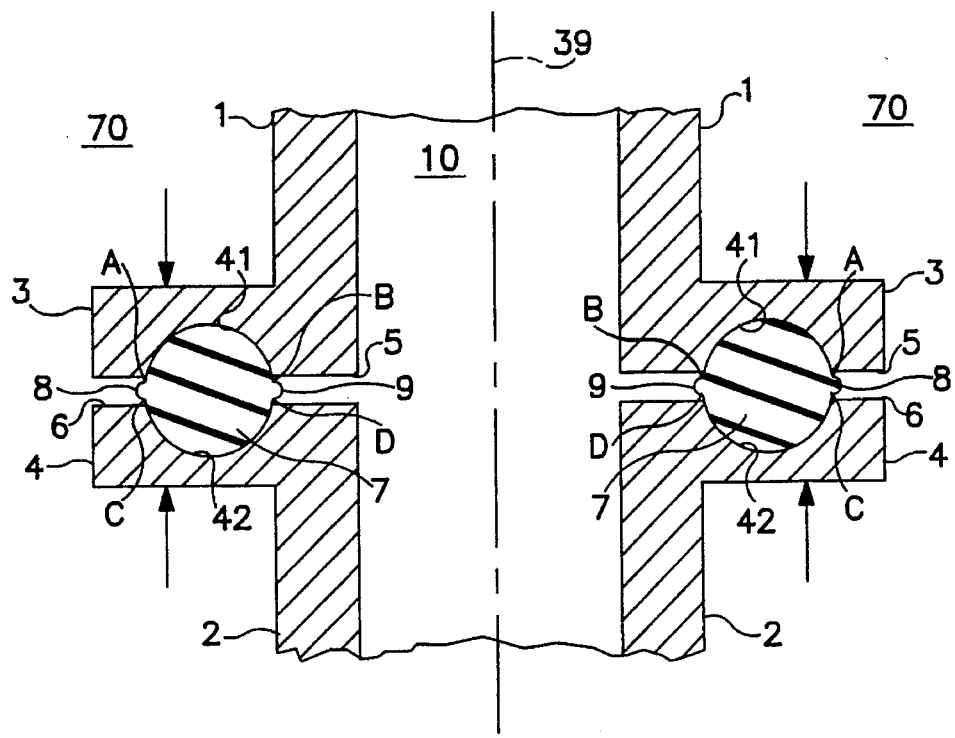
FIG. 1 shows a cross sectional view of a flanged joint of a vacuum pipe 1,2 having an O-ring elastomer seal 7 according to the present invention; the center longitudinal axis 39 of the pipe 1,2 lies in the sectional plane.

Referring to FIG. 1, the invention in one embodiment provides a structure for sealing a joint between two (typically metal) vacuum pipes 1, 2. The upper pipe 1 has a flange 3 at the lower end and the lower pipe 2 has a flange 4 at the upper end. The lower surface 5 of the upper flange 1 faces the upper surface 6 of the lower flange 4 as shown in the drawing. The space between these surfaces is sealed around the entire circumference of the pipes 1,2 to maintain a vacuum in the interior 10 of the two pipes 1,2. Outside the two pipes 1,2 is the ambient atmosphere 70, normally air. The center longitudinal axis of the two pipes 1,2 is designated by numeral 39.

The seal 7 is preferably an O-ring fabricated from an elastomer material, such as Viton® (a fluoroelastomer manufactured by DuPont Corporation). Seal 7 is made in a mold under high temperature and pressure. The elastomer surface can be smoothed out by using electropolished molds and careful mold alignment that eliminates mold flash marks. The O-ring 7 shown in FIG. 1 has a substantially circular cross section. This O-ring 7 fits into a groove 41 in the upper flange 3, and a corresponding groove 42 in the lower flange 4. These groove surfaces 41, 42 are each substantially semicircular in cross section. The flanges 3, 4 are pressed together by conventional clamping means not shown in the drawings but represented by arrows. The clamping force causes the surfaces 41, 42 to maintain pressing contact with the surface of the O-ring 7 along substantially the entire groove surfaces 41, 42. Thus, the surface of the O-ring 7 conforms to the shape of the surfaces 41, 42 of the grooves in the flanges 3, 4.

In the sealing position, the upper and lower surfaces 5, 6 of the flanges 3, 4 define the passage space that is sealed by the O-ring 7. The outer surface 8 of the O-ring 1 between these surfaces 5, 6 is exposed to the atmosphere 70, and the corresponding inner surface 9 of the O-ring 7 is exposed to the vacuum 10. The efficiency of the seal 7 is improved by making the flange surfaces 5, 6 as close together as possible in the clamped sealing position, so that the exposed area of the O-ring surfaces 8, 9 is minimized.

The groove surfaces 41, 42 are preferably highly polished. A surface finish polished to 4 microinches, followed by chem polishing or electropolishing, is sufficient to provide a surface that is flat enough so that the elastomer 7 can contact the surface with close to 100% efficiency. Additional improvement can be obtained by diamond polishing the 4 microinch polished surface before chem polishing or electropolishing. The diamond polish step utilizes diamond dust embedded in a carrier material, and is known in the art.

The preferred method for forming the groove surfaces 41, 42 is by means of a machining tool that cuts these grooves in a single pass. This eliminates the spiral grooves in the metal surface 41,42 under the elastomer 7 that characterize previous seals. Single pass machining has been utilized previously for polished surfaces in other contexts; however, this technique has not been employed for vacuum elastomer seals prior to the present invention.

The materials that are suitable for the elastomer seal 7 are the same as those used in prior elastomer seals. As mentioned previously, Viton® is a suitable elastomer. Other suitable materials are discussed in the article by R. N. Peacock entitled "Practical selection of elastomer materials for vacuum seals", published in the Journal of Vacuum Science Technology, Vol. 17(1), pages 330–336, January/February 1980.

Figure 2:
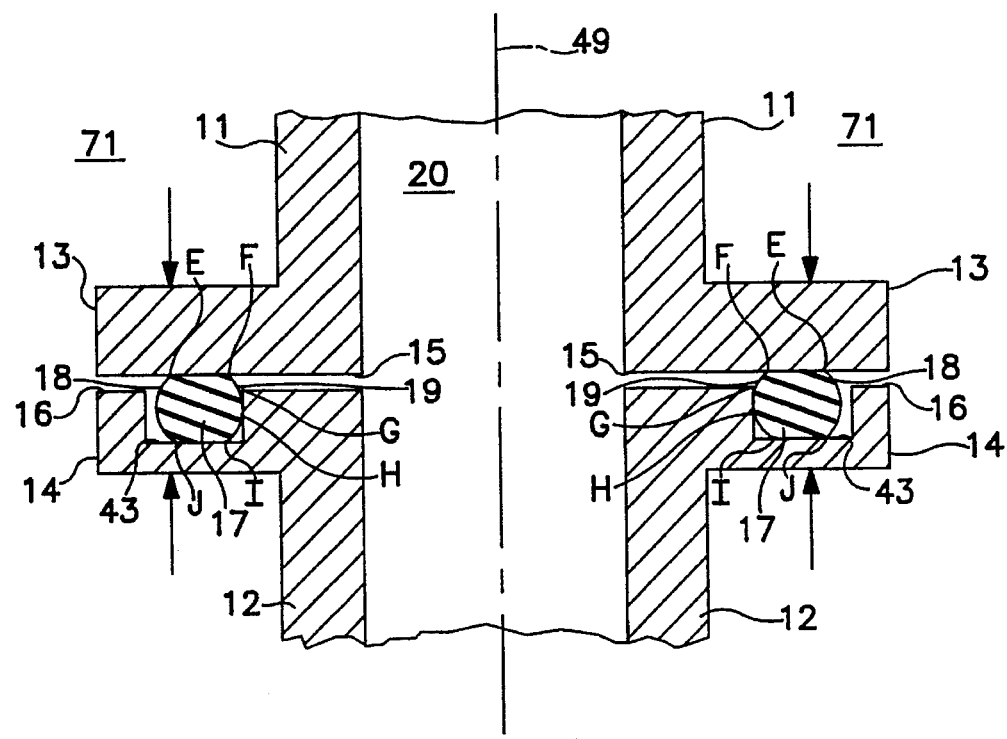
FIG. 2 is a cross sectional view of a ranged joint of a vacuum pipe 11,12 having an O-ring elastomer seal 17 according to the prior art, where the longitudinal axis 49 of the pipe 11,12 lies in the sectional plane.

It has been found that the present structure can significantly lower the leakage through and around the elastomer seal 7 by a factor of up to at least 1000 compared with the prior art, without using any grease on the elastomer 7 surface. Whereas conventional elastomer seals, such as that shown in FIG. 2, are generally limited to vacuums of $10^{-8}$ torr, the present structure is capable of sealing a vacuum of the order $10^{-11}$ torr to $10^{-12}$ torr. Thus, the invention allows one to use dry elastomer seals in UHV systems.

For comparison purposes, FIG. 2 shows a typical elastomer seal 17 in a conventional prior art flange joint between vacuum pipes 11, 12. The upper flange 13 and lower flange 14 have lower and upper surfaces 15, 16 respectively, defining the passage to be sealed between the vacuum region 20 and the atmosphere 71. The elastomer O-ring seal 17 is located in this passageway. A groove 43 is cut in the lower surface 16, in which the O-ring 17 fits. The purpose of groove 43 is to locate elastomer 17 and to keep it from moving during assembly. In some prior art applications, no groove 43 is used: flange surfaces 15 and 16 are flat. The arrows in FIG. 2 indicate conventional clamping means, not shown in the drawing. The central longitudinal axis of the two pipes 11,12 is designated by numeral 49.

Comparing FIGS. 1 and 2, it will be seen that in the prior an O-ring seal flange joint, the O-ring 17 surface contacts a smaller portion of the flange surfaces 15, 16, 43 than in the present structure. Groove 43 is cut with dimensions designed per manufacturer suggestions to intentionally not allow more than about 10% to 20% vertical (one dimension) compression. The width of the groove 43 is usually wider than the elastomer 17 so as to help prevent gasses from being trapped in the corners of the groove 43 and to limit and control the compression of the elastomer 17. The prior art uses the elastomer 17 as a spring, and the groove 43 depth and width are structured to prevent over-compression and thermal set. O-ring 17 tends to deform, so that the exposed surfaces 18, 19 are squeezed laterally outwardly. This has the drawback that during bakeout treatment, O-ring 17 undergoes thermal setting and deforms permanently. This deformation tends to degrade the sealing efficiency of O-ring 17. Finally, it will be seen from comparison of FIGS. 1 and 2 that the area of the exposed surfaces 18, 19 in the conventional structure is greater than the area of the corresponding surfaces 8, 9 in the present invention.

In summary, there are four sources of improvement of the present invention compared with the prior art that can each give approximately an order of magnitude improvement in the effectiveness of the seal 7. Therefore, a total improvement on the order of four orders of magnitude could be obtained by using the present invention. The first source of improvement is the preferred preprocessing of the metal surface 41,42 as described above. The second source of improvement is the approximate order of magnitude increase in the path length around the seal 7 between vacuum 10 and atmosphere 70 in FIG. 1 as compared with the corresponding path length from vacuum 20 to atmosphere 71 around seal 17 in the FIG. 2 illustration. This is due to the fact that practically the entire surface of the elastomer 7 is in contact with the grooves 41, 42. The third source of improvement is the approximate order of magnitude increase in the permeation path length through the seal 7 in FIG. 1 as compared with the corresponding path length through seal 17 in FIG. 2. In FIG. 1, the permeation path length is approximately equal to the diameter of seal 7 and generally follows the line connecting the region between points A and C and the region between points B and D. In FIG. 2, the permeation path length is approximately the distance between points E and F, where very short surface "worm holes" contribute to the leak path. The fourth source of improvement of the present invention compared with the prior art is the approximate order of magnitude decrease in the exposed surface area of seal 7, further reducing the permeation rate. In FIG. 1, this exposed surface area is the region between points A and C plus the region between points B and D. In FIG. 2, this exposed surface area is the region between points E and J, plus the region between points F and G, plus the region between points H and I.

In addition, the present invention provides an improvement in the durability of the seal 7 itself, which further reduces gas leakage. FIG. 1 shows that O-ring 7 is substantially contained by the semicircular grooves 41,42. When the flanges 3,4 are clamped together, the deformation strain of O-ring seal 7 is primarily pure compression, whereas in the conventional structure of FIG. 2, there is a substantial amount of shear strain on seal 17. For the present invention, the seal 7 cross section may be reduced by up to 20% under compression, although adequate sealing has been obtained with compression as low as 4%. Since the seal 7 tends to retain its elasticity under pure compression, the durability is improved by the present structure.

Figure 3:
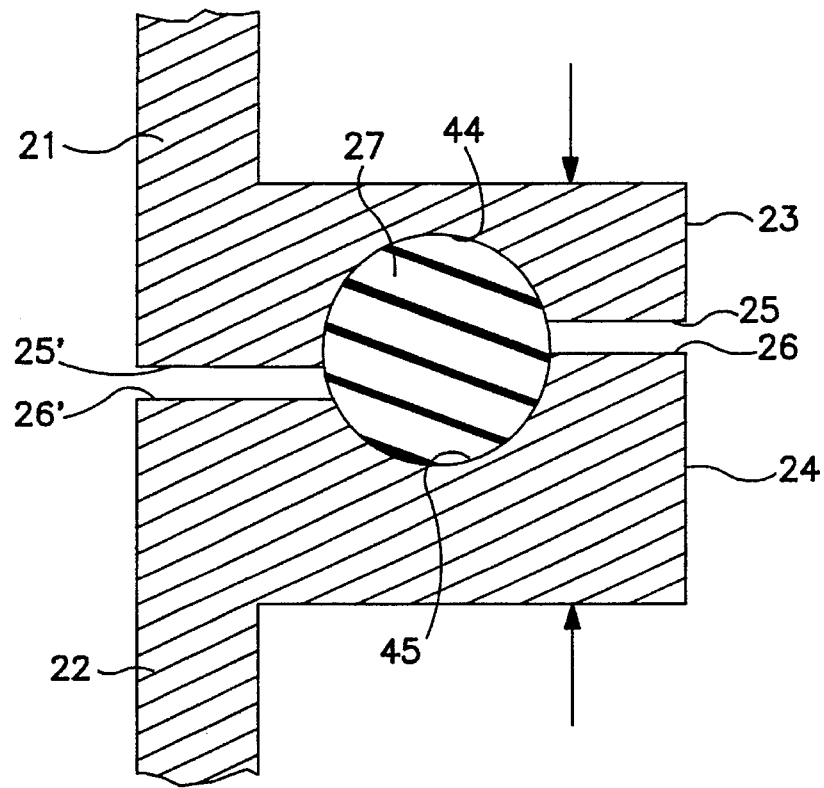
FIG. 3 is a cross sectional view of one wall of a vacuum pipe 21,22 joint showing an alternative embodiment of the present invention.

The invention is not restricted precisely to the structure illustrated in FIG. 1. FIG. 3 shows pipes 21,22 having a flange structure in which the mating surfaces 25, 25' and 26, 26' of flanges 23, 24, respectively, are offset longitudinally. The elastomer O-ring 27 is again circular in cross section. The elastomer 27 surface again conforms to the surfaces of the grooves 44, 45 in the flanges 23,24. These grooves 44,45 have cross sections which are substantially semicircles (but not half circles as in FIG. 1).

Figure 4:
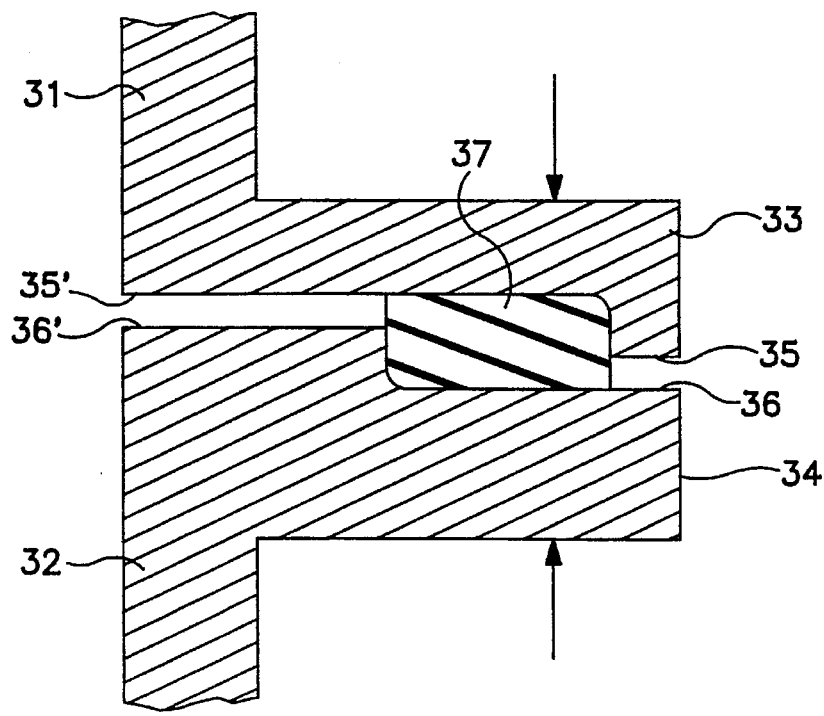
FIG. 4 is a cross sectional view of one wall of a vacuum pipe 31,32 joint, showing a further embodiment of the present invention.

The elastomer O-ring is not restricted to having a circular cross section. Indeed, the prior art includes elastomer seals of many cross-sectional styles, all of which can be used in the present conformal-groove invention. FIG. 4 shows a version of the invention in which the elastomer O-ring seal 37 between pipes 31,32 has a generally rectangular cross section. The mating surfaces 35, 35' and 36, 36' of the flanges 33, 34, respectively, are again fashioned to conform to the surface of the elastomer seal 37 when the flanges 33,34 are clamped together. Here the flange 33,34 surfaces have offsets 35, 35', 36, 36', respectively, rather than grooves, to form the seal 37 cavity.

The preceding discussion has described the invention in terms of seals 7, 27, 37 between flange joints in vacuum pipes 1 and 2, 21 and 22, and 31 and 32. However, the invention is not restricted to pipe joint seals. The improved structure can be used in seals between any abutting walls, which in the foregoing examples were the upper and lower surfaces of pipe flanges. The invention can be practiced with joints of practically any type that include elastomer seals, or other seals (such as soft metal seals) where the seal material is compressible or it is shaped to allow sealable change when clamped. Elastomer seals are usually reusable and are therefore preferred in many application as compared with metal seals, which have a one time use.

Figure 5A:
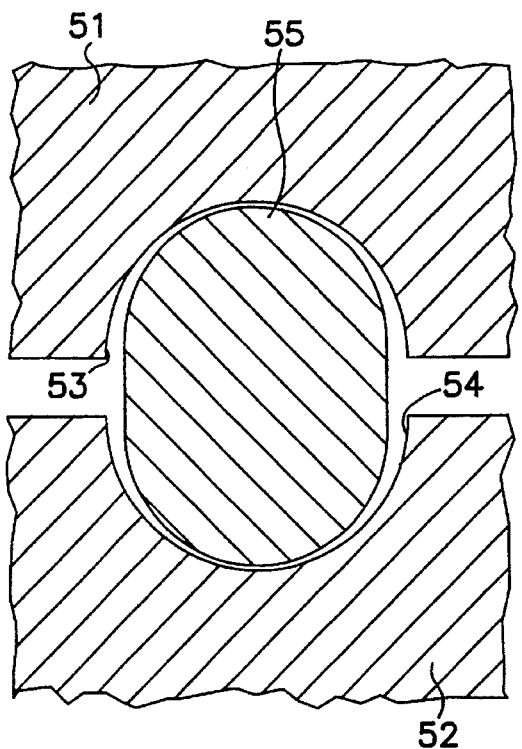
FIGS. 5A and 5C are cross sectional views of a first and second embodiment of the present invention in which seal 55 is metallic, shown prior to compression.
Figure 5B:
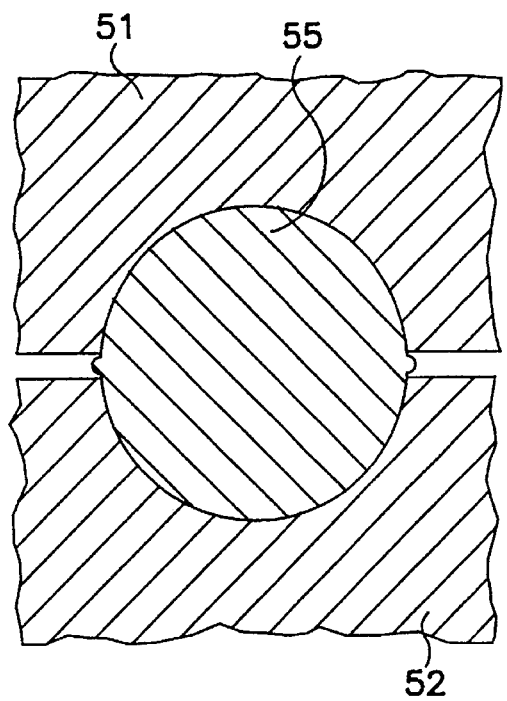
FIGS. 5B and 5D are cross-sectional views of FIGS. 5A and 5C after compression.

FIGS. 5A and 5B illustrate a first embodiment using a metallic seal 55. In this embodiment, the metallic seal 55 has an oval or ellipsoidal shape prior to compression (FIG. 5A). Seal 55 is positioned between upper flange 51 and lower flange 52. A groove 53 having a semicircular cross section is cut from the lower surface of flange 51. A groove 54 having a semicircular cross section is cut from the upper surface of flange 52. FIG. 5B shows that after compression, seal 55 takes on a shape having practically a circular cross section, with slight bulging in the open space between flanges 51 and 52.

Figure 5C:
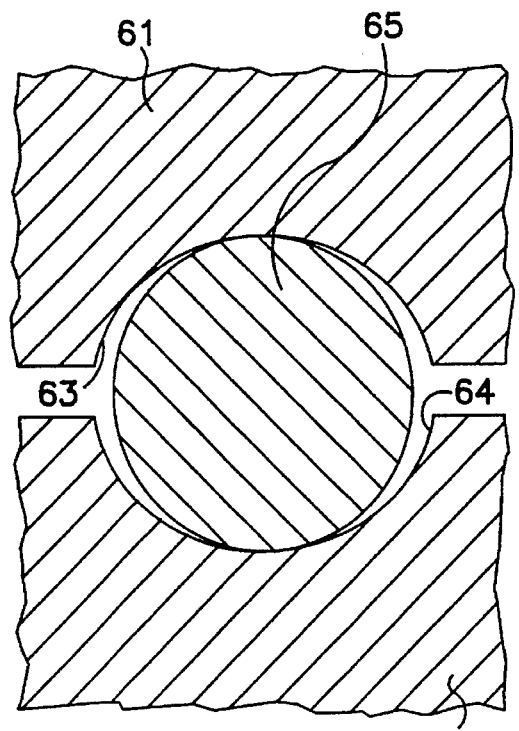
Figure 5D:
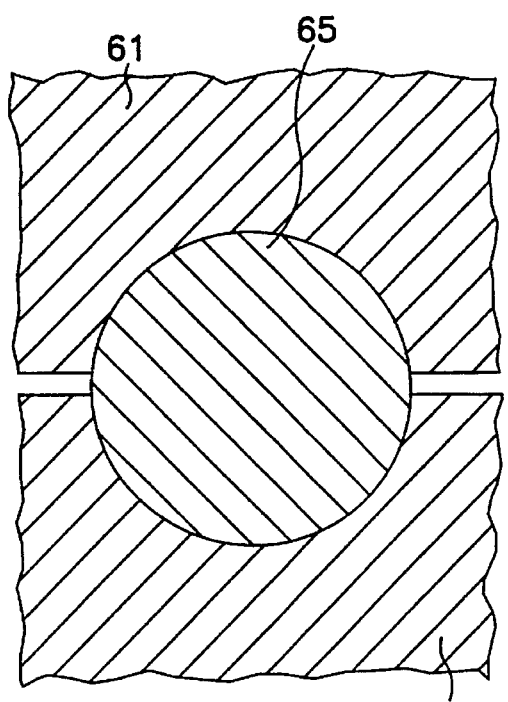

FIGS. 5C and 5D illustrate a second metallic seal embodiment. In this embodiment, seal 65 has a circular cross section prior to compression (FIG. 5C). Seal 65 is positioned between upper flange 61 and lower flange 62. A groove 63 having an elliptical cross section or slightly less than semi circular cross section is cut from the lower surface of flange 61. A groove 64 having an elliptical cross section or slightly less than semi circular cross section is cut from the lower surface of flange 62. FIG. 5D shows that after compression, seal 65 has a generally elliptical cross section, with slight bulging in the open area between flanges 61 and 62.

FIGS. 5A, 5B, 5C and 5D also apply to elastomer seal application.

Is also should be noted that this sealing technology works also for high pressure applications where the internal chamber is under high pressure (air or hydraulic) vs the external atmospheric air, i.e. the seal technology improves the seal pressure differential regardless of the nature of the pressure differential (above or below atmosphere).

Also high pressure seals tend to blow out because of the pressure involved. This conformal seal design reduces blow out and for the same reason as in vacuum application, reduces seal leakage.

The foregoing description of the preferred embodiments of the invention is presented only for purposes of illustration and description. It is not intended to be exhaustive or to limit the invention to the precise forms disclosed, and many modifications and variations are possible in light of the above teaching. These embodiments were chosen and described in order to best explain the principles of the invention and its practical applications to thereby enable others skilled in the art to best utilize the invention in various embodiments and with various modifications as are suitable to the particular use contemplated. It is intended that the spirit and scope of the invention are to be defined by reference to the claims appended hereto.

What is claimed is:

1. A seal for an ultra high vacuum joint comprising:

A first flange having a first planar surface portion and a second flange having a second planar surface portion, said first and second planar surface portions being closely spaced apart to form a narrow gap between said first and second flanges;

said first and second flange planar surfaces each having a curved surface indentation having a first and second volume respectively, said first and second volume forming a seal cavity having a third volume when said first and second flange planar surfaces are aligned and brought toward each other, said seal cavity having curved internal surfaces having a surface smoothness on the order of 4 microinches or better;

a sealing O-ring material having a fourth volume when in a relaxed state, said sealing O-ring material being in said seal cavity in contact with said internal surfaces, said sealing material having an outer surface with a curve conforming to said seal cavity internal surfaces over substantially the entire internal surfaces of said seal cavity wherein said third volume is less than said fourth volume; and said first and second flanges being positioned with respect to each other so that said sealing material is compressed therebetween, wherein said first and second flange and said sealing material form an isolated chamber in which said ultra high vacuum can be maintained.

2. The seal of claim 1 wherein said sealing material is an elastomer.

3. The seal of claim 1 wherein the sealing material is a soft metal.

4. The seal as recited in claim 1 wherein said curved surface indentations have a cross-section that is substantially circular so that said interior surface of said seal cavity has a cross-section which substantially comprises two circular arcs separated by a narrow gap.

5. A seal as recited in claim 4 wherein the smoothness of the inner surface of said seal cavity has been further improved by a mechanical polishing operation.

6. A seal as recited in claim 5 wherein the inner surface smoothness of said seal cavity has been still further smoothed by chemical polishing.

7. A seal as recited in claim 5 wherein the inner surface smoothness of said seal cavity has been still further smoothed by electropolishing.

8. The seal as recited in claim 2 wherein said curved surface indentations have a cross-section that is substantially circular so that the inner surface of said seal cavity has a cross-section which substantially comprises two circular arcs separated by a narrow gap.

\* \* \* \* \*